H. B. DOOLITTLE.
SLIDE-VALVE ADJUSTER.

No. 195,748. Patented Oct. 2, 1877.

WITNESSES:
H. Rydquist
J. H. Scarborough.

INVENTOR:
H. B. Doolittle.
BY Munn & Co
ATTORNEYS.

UNITED STATES PATENT OFFICE.

HENRY B. DOOLITTLE, OF DOOLITTLE'S MILLS, INDIANA.

IMPROVEMENT IN SLIDE-VALVE ADJUSTERS.

Specification forming part of Letters Patent No. 195,748, dated October 2, 1877; application filed July 23, 1877.

*To all whom it may concern:*

Be it known that I, HENRY B. DOOLITTLE, of Doolittle's Mills, in the county of Perry and State of Indiana, have invented a new and Improved Slide-Valve Adjuster, of which the following is a specification:

This invention relates to means for adjusting the strokes of the slide-valves of reciprocating high-pressure engines; and the nature of my invention consists in an attachment for steam-engines which is applicable to the arm of the rock-shaft, and constructed with an adjustable slide having a wrist-pin to connect with the rod of an eccentric on the main shaft, as will be hereinafter explained.

My object is to adapt a valve-adjuster to engines as now constructed, so that the adjuster can be attached to the arm of the rock-shaft without in any manner altering the engine.

Figure 1:
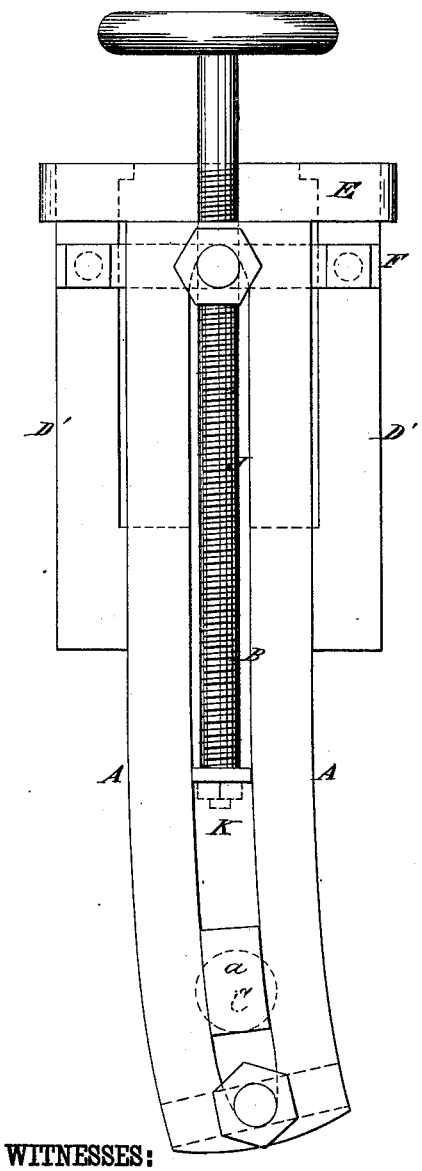
Figure 2:
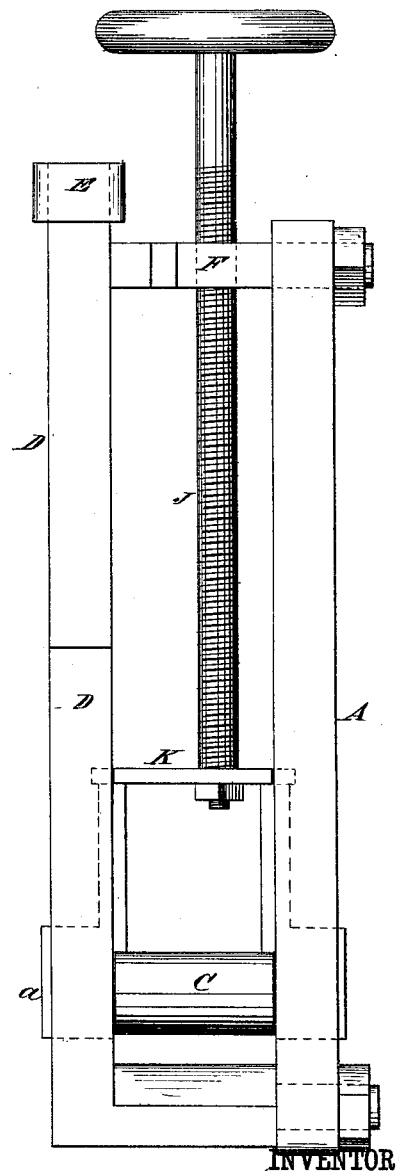

In the annexed drawings, Figure 1 is a front view of the adjuster. Fig. 2 is a side elevation of the same.

Similar letters of reference indicate corresponding parts.

In the annexed drawings, A A designate two curved bars, which are secured together so as to leave a slot, B, between them. These bars may be formed separate, and united by welding or otherwise. They are the guides for the outer flattened end $a$ of a wrist-pin, C, to which is attached the rod of an eccentric that is fixed on the main shaft of the engine. D, Fig. 2, designates two bars, which are parallel to the bars A A, (shown in Fig. 1,) and which have the same curvature as these bars, but are somewhat shorter. The inner flattened end of the wrist-pin C is guided between the bars D. The upper ends of bars D D are welded or otherwise secured to bars D' D', which are parallel to each other, and form a receptacle for the lower extremity of the rock-shaft of the engine. The upper ends of the extensions D' D' are connected together by a loop, E, and also by a block, F, which latter is bolted to bars D' D', and also to the upper ends of bars A A. The block F is screw-tapped, and receives through it a screw, J, which is attached by a swivel to a yoke, K, rigidly fixed to the wrist-pin C. By turning this screw J the wrist-pin can be adjusted and the throw of the rock-shaft shortened or lengthened according to the movement which it is required to give the valve. By removing the screw J, and attaching a governor-rod to the wrist-pin, bail, or yoke, the wrist-pin will be adjusted automatically.

Instead of constructing the block F with lugs and bolting it to the bars A D', as above described, this block may be constructed with recesses to receive the said bars, thereby rendering it unnecessary to weaken them in order to apply the block F.

Having thus described my invention, I claim as new and desire to secure by Letters Patent—

An attachment for reducing the throw of slide-valve in the steam-chests of engines, to adapt them to light work, consisting of a wrist-pin, C, yoke K, rigidly attached thereto, the screw J, swiveled to yoke, the end-curved guides A A, and the bars D D, having extensions D, connected by loop E and block F, all as shown and described, the working parts being thus below and fastened to the arm of rock-shaft.

HENRY BLACK DOOLITTLE.

Witnesses:
JAMES H. CURRY,
WM. W. PARRY.